United States Patent [19]

Neuhäuser et al.

[11] Patent Number: 4,612,256
[45] Date of Patent: Sep. 16, 1986

[54] WEAR-RESISTANT COATING

[75] Inventors: Hans J. Neuhäuser, Bergisch-Gladbach; Ulrich Buran, Burscheid; Manfred Fischer, Leichlingen, all of Fed. Rep. of Germany

[73] Assignee: Goetze AG, Burscheid, Fed. Rep. of Germany

[21] Appl. No.: 604,484

[22] Filed: Apr. 27, 1984

[30] Foreign Application Priority Data

Apr. 29, 1983 [DE] Fed. Rep. of Germany ....... 3315556

[51] Int. Cl.$^4$ .................. B22F 3/00; C25D 13/00; B05D 1/36
[52] U.S. Cl. ...................... 428/547; 427/402; 427/404; 427/421; 427/423; 428/908.8; 428/697; 428/937; 428/548; 428/553
[58] Field of Search ........ 428/546, 547, 548, 550–558, 428/937, 908.8, 697; 427/34, 402, 421, 423, 404

[56] References Cited

U.S. PATENT DOCUMENTS

| 3,091,548 | 5/1963 | Dillon | 428/937 |
| 3,467,588 | 9/1969 | Gebler et al. | 428/547 |
| 3,705,450 | 12/1972 | Morisaki | 428/551 |
| 3,749,559 | 7/1973 | Prasse | 428/937 |
| 3,758,233 | 9/1973 | Cross et al. | 416/229 |
| 3,975,165 | 8/1976 | Elbert et al. | 428/553 |
| 4,077,637 | 3/1978 | Hyde et al. | 277/235 A |
| 4,095,005 | 6/1978 | Kishida et al. | 427/376 B |
| 4,101,319 | 7/1978 | Beyer et al. | 428/553 |
| 4,248,440 | 2/1981 | McCormick | 277/224 |
| 4,251,599 | 2/1981 | McCormick | 428/937 |
| 4,387,140 | 6/1983 | Kondo et al. | 428/553 |
| 4,420,543 | 12/1983 | Kondo et al. | 427/423 |
| 4,461,799 | 7/1984 | Gavrilov et al. | 428/908.8 |

FOREIGN PATENT DOCUMENTS

| 75228 | 9/1982 | European Pat. Off. . |
| 869570 | 3/1954 | Fed. Rep. of Germany . |
| 1273955 | 7/1968 | Fed. Rep. of Germany . |
| 2433814 | 1/1976 | Fed. Rep. of Germany . |
| 3033332 | 12/1982 | Fed. Rep. of Germany . |
| 58-52469 | 3/1983 | Japan . |
| 01898 | 6/1982 | World Int. Prop. O. . |
| 2027518 | 2/1980 | United Kingdom . |
| 2069537 | 8/1981 | United Kingdom | 428/548 |

Primary Examiner—John F. Terapane
Assistant Examiner—T. J. Wallen
Attorney, Agent, or Firm—Spencer & Frank

[57] ABSTRACT

Wear-resistant coating on a machine part which is subject to friction wear, the coating being applied by a flame spray process and being composed of a plurality of superposed sprayed-on layers each differing in structure or composition from each layer adjacent thereto.

24 Claims, 2 Drawing Figures

WEAR-RESISTANT COATING

BACKGROUND OF THE INVENTION

The present invention relates to a wear-resistant coating for machine parts which are subject to friction wear, such as, in particular, the bearing faces of piston rings used in internal-combustion engines, with the coating being applied by a flame-spraying process, preferably a plasma jet spraying process, in the form of a uniform coating or as a body filling a chamber, or groove.

To improve the service life of machine parts which are subject to extreme wear stresses it is customary to coat such parts with wear protection coatings preferably of metals, metal ceramic materials and/or purely ceramic materials by a flame-spraying or plasma jet spraying process. On the bearing faces of piston rings, molybdenum coatings applied by a flame spraying process or molybdenum containing coatings applied by a plasma jet spraying process have been found particularly satisfactory if they are applied either onto the entire surface area of the bearing faces in the form of a spray coating on a smooth surface or in a groove.

When piston rings are under extreme stresses, as for example when they run dry due to damage to the engine or in modern high-speed Diesel engines, particularly turbo-charged engines, cracks may form in the molybdenum coating as a result of overheating and these may lead to the coatings flaking off or breaking out. For that reason, molybdenum alloys or other alloys as well as ceramic materials with or without the addition of low-melting point alloys or intermetallic compounds have been used primarily as binder metals for the coatings on piston rings. However, only some of these measures have brought the desired results.

Coatings on the bearing faces of machine parts which are subjected to friction wear, in addition to exhibiting good and temperature-stable adhesion to the substrate and a good and temperature-stable cohesion within the coating, must also be, inter alia, burn trace proof and wear-resistant on their surface regions which are in contact with a friction partner, must be porous there to accommodate lubricants, must have sufficient inherent lubrication during dry running and in the start-up phase, and their inherent wear must suffice to adapt them to their counterfaces. Additionally, such coatings should be highly resistant to breakouts and exhibit no or only very slight fatigue even after long periods of use. Likewise, particularly when applied as a spray coating in a groove, the coefficients of thermal expansion of the substrate and of the coating material should be adapted to one another in such a way that stress formations with subsequent coating breakouts cannot develop during engine operation.

The prior art alloy coatings or ceramic coatings, however, usually do not exhibit all these characteristics simultaneously and measures to increase wear resistance of the coatings, for example by the addition of hard metals, have again resulted in reduced adhesion of the layers to the substrate and reduced inherent strength of the coatings so that such coatings are not breakout proof and are sensitive to thermal shocks.

In the piston ring coating art, for example when applying hard chromium electrolytically, it is customary to use intermediate layers to improve adhesion of the hard chromium layer on the substrate or to provide the surfaces with soft metal coatings to improve the start-up behavior of the rings. Although such measures are often effective, the application of intermediate and start-up layers requires additional process steps which increase the cost of the rings and, due to the lack of adhesion between individual layers, this often likewise results in damage under extreme stresses.

SUMMARY OF THE INVENTION

It is therefore an object of the present invention to provide the bearing faces of machine parts subject to friction wear, and particularly the bearing faces of piston rings, with wear-resistant coatings which are applied by a flame spraying process, primarily a plasma jet spraying process, and which are able to withstand extreme stresses if necessary.

The present invention further provides a process for manufacturing the layers which is as simple and economical as possible and primarily allows for production of wear-resistant coatings with characteristics which are adapted to their respective intended use.

The above and other objects are accomplished, according to the present invention by a wear-resistant coating composed of a plurality of superposed sprayed layers having respectively different structures and/or compositions. Preferably, the coating contains between five and ten superposed sprayed layers.

DESCRIPTION OF THE PREFERRED EMBODIMENTS

Figure 1:
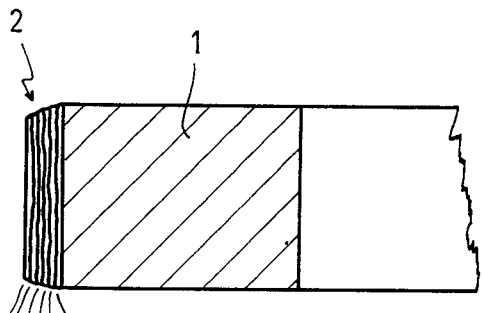
FIG. 1 is a cross-sectional view of a piston ring provided with a sprayed-on coating according to the invention.

In FIG. 1, piston ring 1 is composed of a total of six superposed sprayed coating layers 3, 4, 5, 6, 7, 8, all having approximately the same thickness.

Figure 2:
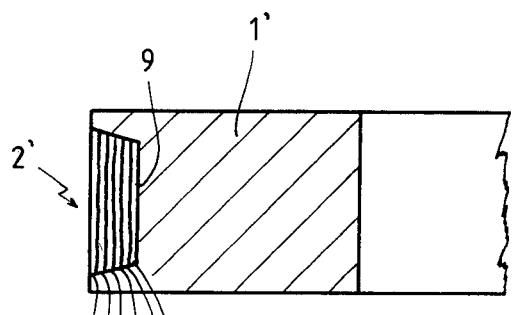
FIG. 2 is a cross-sectional view of a piston ring provided with a coating in chambered form according to the invention.

In FIG. 2, piston ring 1' has a chamber, or groove, 9 which is provided with a wear-resistant coating 2' composed of the superposed sprayed layers 3', 4', 5', 6', 7', 8'.

The wear-resistant coating according to the invention is preferably produced of a spray powder mixture containing at least two different components which are applied in succession while changing their quantitative composition ratios so that the coating is composed of a plurality of superposed sprayed layers of qualitatively the same but quantitatively different compositions. The components which are preferably applied in a spray powder mixture are molybdenum powder, for which the quantities are varied between 25 and 65%, molybdenum carbide powder and/or chromium carbide powder, varied in quantity between 10 and 50%, and a binder metal powder, preferably of a nickel-aluminum alloy and/or a nickel-chromium-aluminum alloy, varied in quantity between 10 and 35%. A coating produced with such a spray powder then comprises, from the inside out:

layer 1—25% Mo, 50% Mo$_2$C and/or Cr$_3$C$_2$ and 25% binder metal;

layer 2—35% Mo, 40% Mo$_2$C and/or Cr$_3$C$_2$ and 25% binder metal;

layer 3—45% Mo, 30% Mo$_2$C and/or Cr$_3$C$_2$ and 25% binder metal;

layer 4—55% Mo, 20% Mo$_2$C and/or Cr$_3$C$_2$ and 25% binder metal;

layer 5—65% Mo, 10% Mo$_2$C and/or Cr$_3$C$_2$ and 25% binder metal.

A further spray powder mixture used with preference includes molybdenum powder varied in quantity between 20 and 40% ferrochromium powder and/or chromium powder which is varied in quantity between 25 and 60% and a binder metal varied in quantity between 20 and 35%. A coating produced with such a spray powder is then composed as follows, from the inside out:

layer 1—20% Mo, 60% ferrochromium and/or chromium, 20% binder metal;

layer 2—30% Mo, 50% ferrochromium and/or chromium, 20% binder metal;

layer 3—40% Mo, 40% ferrochromium and/or chromium, 20% binder metal;

layer 4—50% Mo, 30% ferrochromium and/or chromium, 20% binder metal;

layer 5—60% Mo, 15% ferrochromium and/or chromium, 25% binder metal.

Another spray powder mixture used with preference includes aluminum oxide (Al$_2$O$_3$) which is varied in quantity between 35 and 60%, titanium dioxide varied in quantity between 20 and 40%, a component mixture containing lanthanum oxide and/or niobium oxide with 20% calcium carbonate, the component mixture being varied in quantity between 5 and 15%, and a binder metal which may amount up to 30%. A coating produced with such a spray powder is then composed as follows, from the inside out:

layer 1—55% Al$_2$O$_3$, 35% TiO$_2$ and 10% La$_2$O$_3$ and/or Nb$_2$O$_5$ and CaCo$_3$, with no binder metal;

layer 2—40% Al$_2$O$_3$, 25% TiO$_2$ and 10% La$_2$O$_3$ and/or Nb$_2$O$_5$ and CaCo$_3$ and 25% binder metal;

layer 3—55% Al$_2$O$_3$, 35% TiO$_2$ and 10% La$_2$O$_3$ and/or Nb$_2$O$_5$ and CaCO$_3$, with no binder metal;

layer 4—40% Al$_2$O$_3$, 25% TiO$_2$ and 10% La$_2$O$_3$ and/or Nb$_2$O$_5$ and CaCO$_3$ and 25% binder metal;

layer 5—55% Al$_2$O$_3$, 35% TiO$_2$ and 10% La$_2$O$_3$ and/or Nb$_2$O$_5$ and CaCO$_3$, with no binder metal.

In further accordance with the invention, before application of the wear-resistant coating to the substrate, an adhesion improving coating may be applied which preferably is composed of molybdenum, a nickel-chromium alloy, a nickel-aluminum alloy and/or a nickel-chromium-aluminum alloy.

Likewise, the spray powders may contain intermetallic compounds based on cobalt and/or a nickel in quantities up to 35%.

Moreover, the spray powders may also contain up to 25% of a solid lubricant, preferably of molybdenum disulfide, tungsten disulfide, boron nitride, calcium fluoride, nickel graphite and/or PTFE. Additionally, the porosity of the superposed sprayed layers may be different, preferably so that the porosity increases in stages from the inside out to a total of about 25%.

Due to the superposition of sprayed coatings of different compositions, the present invention thus provides a wear-resistant coating whose physical properties are optimally adapted to the encountered stress conditions. With the preferred use of a qualitatively uniform spray material whose quantity ratios are varied, however, no special adhesion problems exist between the individual sprayed layers. Due to the fact that the innermost sprayed layers which adhere to the substrate are selected to have such a composition that they assure good adhesion to the substrate, adhesion of the entire coating to the substrate is optimum even under extreme stresses due to overheating. By using larger proportions of wear-resistant components and larger proportions of solid lubricants and due to the higher porosity of the outer sprayed layers, the entire coating is simultaneously wear-resistant and burn trace proof, and good start-up behavior and good inherent lubrication in cases of emergency are assured.

The process of manufacturing the wear-resistant coating is relatively simple and economical. Application may be effected with one or a plurality of spray guns, preferably only with a single spray gun, with the supply of the individual components to be sprayed in the mixture being controlled automatically, possibly electronically. Developmental experiments can be carried out to allow for a relatively quick and easy determination of the optimum composition of the sprayed layers for each particular case of application.

It will be understood that the above description of the present invention is susceptible to various modifications, changes and adaptations, and the same are intended to be comprehended within the meaning and range of equivalents of the appended claims.

What is claimed is:

1. Wear-resistant coating on a machine part which is subject to friction wear, said coating being applied by a flame spraying process and comprising five sprayed-on layers formed of successively applied spray powder mixtures, comprising, in succession, starting from the machine part surface to which said coating is applied:

25% Mo, 50% Mo$_2$C and/or Cr$_3$C$_2$ and 25% binder metal;

35% Mo, 40% Mo$_2$C and/or Cr$_3$C$_2$ and 25% binder metal;

45% Mo, 30% Mo$_2$C and/or Cr$_3$C$_2$ and 25% binder metal;

55% Mo, 20% Mo$_2$C and/or Cr$_3$C$_2$ and 25% binder metal; and

65% Mo, 10% Mo$_2$C and/or Cr$_3$C$_2$ and 25% binder metal.

2. Wear-resistant coating as defined in claim 1, wherein the machine part is a piston ring for an internal combustion engine, and said coating is on the bearing faces of the piston ring.

3. Wear-resistant coating as defined in claim 1, wherein the flame spray process is a plasma jet spraying process.

4. Wear-resistant coating as defined in claim 1, wherein the machine part is provided with a groove and said coating is disposed in the groove.

5. Wear-resistant coating as defined in claim 1, further comprising an adhesion improving layer applied to the machine part before the application of said superposed sprayed-on layers.

6. Wear-resistant coating as defined in claim 5, wherein said adhesion improving layer is composed of at least one of molybdenum, a nickel-chromium alloy, a nickel-aluminum alloy and a nickel-chromium-aluminum alloy.

7. Wear-resistant coating as defined in claim 1, wherein said superposed sprayed-on layers have respectively different porosities which increase progressively from the layer adjacent the machine part to the outermost layer of said coating.

8. Wear-resistant coating as defined in claim 1, wherein all of said layers have at least approximately the same thickness.

9. Wear-resistant coating on a machine part which is subject to friction wear, said coating being applied by a flame spraying process and comprising five superposed sprayed-on layers which are formed of spray powder mixtures having the following composition, in succession, starting from the machine part surface to which said coating is applied:

20% Mo, 60% ferrochromium and/or chromium and 20% binder metal;

30% Mo, 50% ferrochromium and/or chromium and 20% binder metal;

40% Mo, 40% ferrochromium and/or chromium and 20% binder metal;

50% Mo, 30% ferrochromium and/or chromium and 20% binder metal;

60% Mo, 15% ferrochromium and/or chromium and 25% binder metal.

10. Wear-resistant coating as defined in claim 9, wherein the machine part is a piston ring for an internal combustion engine, and said coating is on the bearing faces of the piston ring.

11. Wear-resistant coating as defined in claim 9, wherein the flame spray process is a plasma jet spraying process.

12. Wear-resistant coating as defined in claim 9, wherein the machine part is provided with a groove and said coating is disposed in the groove.

13. Wear-resistant coating as defined in claim 9, further comprising an adhesion improving layer applied to the machine part before the application of said superposed sprayed-on layers.

14. Wear-resistant coating as defined in claim 13, wherein said adhesion improving layer is composed of at least one of molybdenum, a nickel-chromium alloy, a nickel-aluminum alloy and a nickel-chromium-aluminum alloy.

15. Wear-resistant coating as defined in claim 9, wherein said superposed sprayed-on layers have respectively different porosities which increase progressively from the layer adjacent the machine part to the outermost layer of said coating.

16. Wear-resistant coating as defined in claim 9, wherein all of said layers have at least approximately the same thickness.

17. Wear-resistant coating on a machine part which is subject to friction wear, said coating being applied by a flame spraying process and comprising five sprayed-on layers which are composed of five successively applied spray powders having the following composition, starting from the machine part surface to which said coating is applied:

55% $Al_2O_3$, 35% $TiO_2$ and 10% $La_2O_3$ and/or $Nb_2O_5 + CaCO_3$;

40% $Al_2O_3$, 25% $TiO_2$, 10% $La_2O_3$ and/or $Nb_2O_5 + CaCO_3$, and 25% binder metal;

55% $Al_2O_3$, 35% $TiO_2$ and 10% $La_2O_3$ and/or $Nb_2O_5 + CaCO_3$;

40% $Al_2O_3$, 25% $TiO_2$, 10l% $La_2O_3$ and/or $Nb_2O_5 + CaCO_3$, and 25% binder metal;

55% $Al_2O_3$, 35% $TiO_2$ and 10% $La_2O_3$ and/or $Nb_2O_5 + CaCO_3$.

18. Wear-resistant coating as defined in claim 17, wherein the machine part is a piston ring for an internal combustion engine, and said coating is on the bearing faces of the piston ring.

19. Wear-resistant coating as defined in claim 17, wherein the flame spray process is a plasma jet spraying process.

20. Wear-resistant coating as defined in claim 17, wherein the machine part is provided with a groove and said coating is disposed in the groove.

21. Wear-resistant coating as defined in claim 17, further comprising an adhesion improving layer applied to the machine part before the application of said superposed sprayed-on layers.

22. Wear-resistant coating as defined in claim 21, wherein said adhesion improving layer is composed of at least one of molybdenum, a nickel-chromium alloy, a nickel-aluminum alloy and a nickel-chromium-aluminum alloy.

23. Wear-resistant coating as defined in claim 17, wherein said superposed sprayed-on layers have respectively different porosities which increase progressively from the layer adjacent the machine part to the outermost layer of said coating.

24. Wear-resistant coating as defined in claim 17, wherein all of said layers have at least approximately the same thickness.

* * * * *